United States Patent [19]
Furlong

[11] Patent Number: 6,161,997
[45] Date of Patent: Dec. 19, 2000

[54] ARTICULATED HAULING PALLET

[76] Inventor: Eduardo Luis Furlong, 11 de Septiembre 933, 1426 Capital Federal, Argentina

[21] Appl. No.: 09/158,860

[22] Filed: Sep. 23, 1998

[30] Foreign Application Priority Data

Jul. 17, 1998 [AR] Argentina .......................... 980103520

[51] Int. Cl.[7] ............................................... B60P 3/08
[52] U.S. Cl. .............................. 410/24; 410/26; 410/28.1
[58] Field of Search ............................... 410/4, 6, 24, 26, 410/28.1, 29.1; 414/482, 483; 280/415.1, 418.1, 425.1, 467

[56] References Cited

U.S. PATENT DOCUMENTS 4,630,991  12/1986  Landoll et al. ...................... 414/478
5,234,308   8/1993  Mann .................................... 414/480
5,921,742   7/1999  Gearhart ........................... 414/480 X

*Primary Examiner*—D. Glenn Dayoan
*Assistant Examiner*—Scott Carpenter
*Attorney, Agent, or Firm*—Dority & Manning, P.A.

[57] ABSTRACT

The invention refers to a novel hydraulic resource being incorporated in the central section of a hauling pallet in trailers used for the transportation of vehicles in general, as well as other types of loads. Each lateral structure is divided into two sections connected to each other by resting on the same central lower transverse axis. A hydraulic cylinder of vertical action mounted on the front section is required to lift both sections in said connection zone, this causes the descent of the free end of the rear section, allowing vehicles to be transported to get into and out of it. The invention is completed by the utilization of respective hydraulic cylinders of horizontal action arranged as a means to join the top stringers of both facing sections.

4 Claims, 1 Drawing Sheet

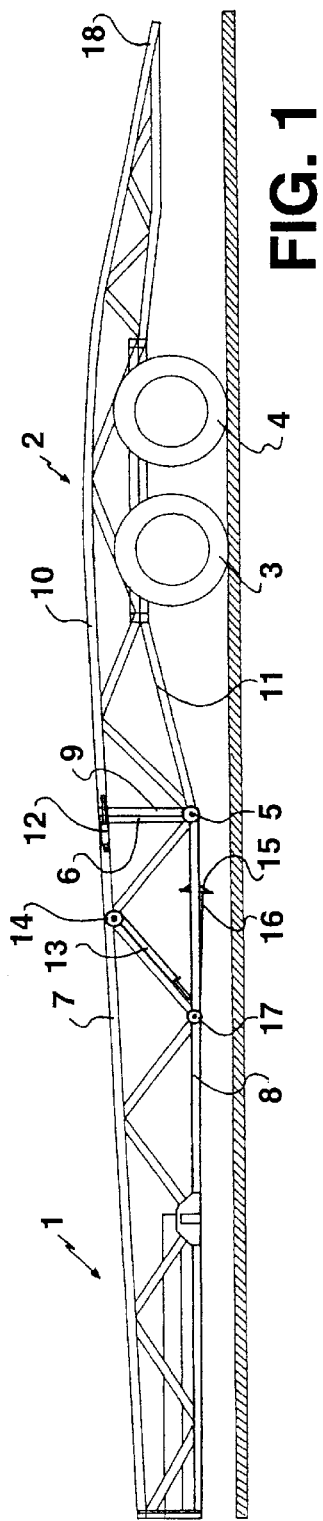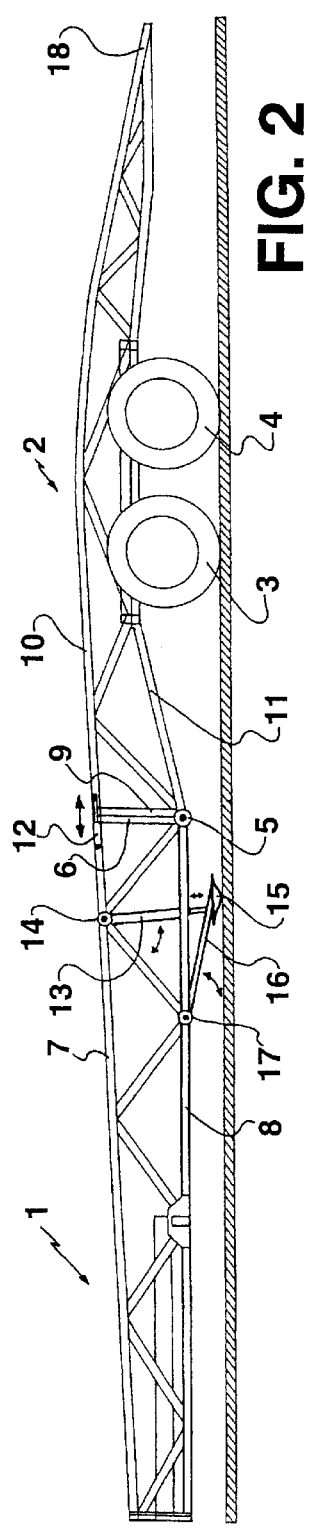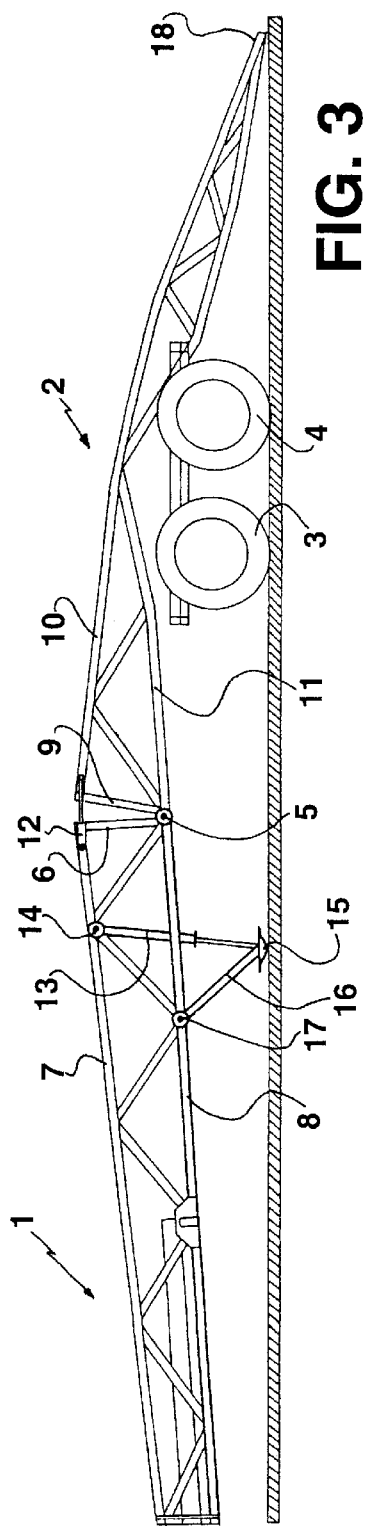

ARTICULATED HAULING PALLET

TECHNICAL FIELD

This invention generally relates to articulated hauling pallets for the transportation of vehicles. More particularly, the invention relates to devices that have the distinguishable functional advantage in its capacity for adopting a loading (and unloading) position, and a transportation position. This invention eliminates the need to include the additional elements required for the access and descent of the vehicles onto the pallet.

BACKGROUND ART

In general, as it is well known, that hauling pallets usually have removable planks incorporated thereto used for loading and unloading the vehicles accommodated in it. Therefore, two problems arise: one of them has to do with the space the pallets occupy and which invariably affects the loading capacity, and the other refers to the need for additional operations in order to place and remove the pallets. Very often it is impossible for only one person to perform this in view of the pallet weight and the removable anchor means usually used.

One solution to the problems mentioned above lies in the fact that the final section of the lateral structures may be mounted on a cross axis such that upon rotation about the axis, the section may be arranged in the loading position, with its free edge resting on the floor, or in the transportation position, with the section elevated. However, this solution has not been accepted for use mainly because the end or rear section is cantilevered, thus requiring the use of additional reinforcements which hamper or complicate the structure design.

OBJECTIVES AND SUMMARY OF THE INVENTION

Specifically, the present invention relates to a particular hauling pallet of the type used by trailers transporting vehicles in general. The hauling pallet consists of side tubular structures joined to each other by lower crossbars, over which there are substantially horizontal platforms upon which vehicles to be transported are located. The structure is defined on a lower chassis resting upon a dual wheel pair placed on the rear sector. On the front end there is a means to couple the same to the coupling plate which joins it to the tractor vehicle.

The hauling pallets are very light in weight and are characterized for leaving a wide inner space free which is occupied by the vehicles to be transported. In general these vehicles are automobiles, lorries and similar ones. Other types of loads may be transported, including closed containers. Particularly, containers which are reused, upon arriving and delivering a load, so that they will not be sent back empty to the place of origin can be transported.

The hauling pallet referred to in the present invention presents a novel construction and functional option. It provides the capacity to place itself in the loading or unloading position without affecting at all the structural stability of the assembly either at the time vehicles get into or out of it, and also during the transportation.

The invented solution consists in arranging an articulation cross axis on a section or sector equidistant from the ends of the pallet. This arrangement does not affect its structural strength capacity. The same may be divided into two longitudinal sections, connected to each other by means of the articulation axis.

The object is to divide the pallet in a transverse vertical plane, located substantially equidistant from the longitudinal free ends. The ends are connected to each other by means of a transverse axis arranged in correspondence with the lower stringers and the rest of the lateral tubular structural sections meeting end to end and in facing relation.

By creating the articulation axis as described above, the invention incorporates an ingenious arrangement of hydraulic cylinders acting in a coordinate and cooperative manner to produce an angular movement at the divided sections of the pallet. This arrangement makes the device capable of arranging itself in the two aforesaid operative positions.

A first pair of hydraulic cylinders is located joining the top facing ends of the sections into which the pallets have been divided. They operate in a substantially horizontal direction. The second pair of hydraulic cylinders is located adjacent the articulation sector, but in correspondence with the rear section of the pallet's lateral structures. The second pair of hydraulic cylinders operate in a substantially vertical direction.

Once the assembly has been thus formed, when the hydraulic cylinders expand, both sections are lifted pivoting with respect to the aforesaid articulation axis. The sections separate at the facing sections that were kept end to end.

The action mentioned above causes rotation of the rear section of the pallet with respect to the articulation axis and with respect to its support point. Its front sector moves up and its rear free end moves down so as to accommodate in the above mentioned loading or unloading position.

In contrast, when the same hydraulic cylinders are compressed up to their resting position, both sections of the pallet are left in facing relation end to end and with the rear free end elevated. This allows for the transportation of the load.

BRIEF DESCRIPTION OF THE DRAWINGS

FIG. 1 is a side view showing a hauling pallet such as those used by trailers manufactured for the transportation of vehicles. This view includes the pivot axis for central-transverse articulation.

FIG. 2 is a side view of the same hauling pallet shown in FIG. 1, showing the arrangement of the means used in a transportation position so that the action allowing the loading and unloading position may start.

FIG. 3 is also a side view representing the same hauling pallet of previous figures in a loading position. The figure shows a position suitable to allow the access or descent of the vehicles being transported.

It is to be understood, that in all figures, the same reference numbers correspond to same or equivalent assembly parts or constitutive elements, pursuant to the example selected for the present description of the invented articulated hauling pallet.

DETAILED DESCRIPTION OF THE PREFERRED EMBODIMENT

For the purpose of completing the advantages briefly commented herein, to which users and people skilled in the art may add many others, and to facilitate the understanding of the constructive, constitutive and functional characteristics of the hauling pallet of the invention, a preferred example of the embodiment schematically illustrated, not to a predetermined scale, is described. It is to be understood that since it is merely an example the same has no restraining or exclusive feature over the scope of the present patent of invention, but it is intended to merely illustrate and explain the basic idea on which this invention is based. The present invention includes any modifications and variations as come within the scope of the appended claims and their equivalents.

As it may be observed in the figures, the articulated hauling pallet to which the present invention refers is the type of assembly comprising two tubular structures laterally arranged. They are joined to one another by lower stringers (not shown) over which horizontal platforms (not shown) rest. The platforms are the support floor for the vehicles and the load to be transported. The pallet includes in its front section 1 means for its front support and its coupling to the coupling plate (not shown) located in the tractor vehicle. The rear section 2 rests over a dual pair of wheels 3 and 4.

According to the present invention, the front section 1 and the rear section 2 of the articulated pallet are joined to each other by means of a transverse axis 5 located below and respect to which both sections rotate. That is, each section is articulated about the axis 5, in a free rotational condition, by means of respective bushings (not shown) matching its structures. In turn, the front section 1 from the lower transverse axis 5 has vertical posts 6 which extend joined at its ends to stringers 7 and 8. The rear section 2 from the lower transverse axis 5 has vertical posts 9 extending joined at its ends to stringers 10 and 11.

On the other hand, it is to be understood that such as is shown in FIGS. 1 and 2, the vertical posts 6 in the front section 1, are end to end across their lengths with the vertical posts 9 in facing relation.

According to the invention, both sections 1 and 2 are joined at the upper part through respective hydraulic cylinders 12 disposed in a substantially horizontal position, with an end matching section 1 and the other matching section 2.

The same figures show that in relation to the rear sector of the front section 1, the invented hauling pallet has another pair of hydraulic cylinders 13 pivoting with respect to respective axis 14 mounted on the top stringers 7.

Also, the invention is completed with the presence of a pair of lateral support feet 15 matching respective legs 16 articulated at the transverse axis 17. Transverse axis 17 is located within lower stringers 8.

As may be observed in FIG. 1, the hauling pallet, in the transportation position, maintains its vertical posts 6 and 9 mutually end to end. The structural stress imparted to support the weight of the load transported is not affected.

When a user desires to load or unload vehicles that require to be transported, the user disengages respective legs 16 and the hydraulic cylinders 13 hanging from the respective axis 14 and they are arranged in a substantially vertical position resting on feet 15. This arrangement is shown in FIG. 2.

Once the elements are placed as indicated in the previous paragraph, it will be sufficient for the user to start or activate the hydraulic cylinders 12 and 13. Expansion, as shown in FIG. 3, produces the elevation of both sections 1 and 2 in their facing portions. This achieves the effect sought since the rear free end 18 of section 2 rests on the floor, allowing the above mentioned vehicles or load to be transported to get into and out of the pallet.

Obviously, upon achieving the loading or unloading, the activation of the hydraulic cylinders in opposed direction will suffice so that the pallet will place itself again in the transportation position, as represented in FIG. 3.

It will be apparent to those skilled in the art that various modifications and variations can be made without departing from the scope and spirit of the invention, as embodied in the appended claims and their equivalents.

What is claimed is:

1. An articulated hauling pallet pivotable between a transportation position and a loading position, the articulated hauling pallet comprising:

a front section defined by a pair of joined front lateral tubular structures, each of said front lateral tubular structures including a front top stringer, a front bottom stringer, and a front vertical post located on an end of said front lateral tubular structure;

a back section defined by a pair of joined back lateral tubular structures, each of said back lateral tubular structures including a back top stringer, a back bottom stringer, and a back vertical post located on an end of said back lateral tubular structure, said front section being pivotally joined to said back section at a central lower transverse axis for movement of said front section and said back section between the transportation position and the loading position, said front vertical post and said back vertical post extending adjacently end to end when said front section and said back section are in the transportation position;

a pair of first hydraulic cylinders, each extending between a respective front top stringer and a respective back top stringer;

a pair of second hydraulic cylinders, each pivotally mounted to a respective front lateral tubular section and being connectable to a respective one of a pair of support feet, operation of said first and second hydraulic cylinders moving said front section and said back section between the transportation position and the loading position.

2. The apparatus of claim 1, wherein each said front vertical post of said front section extends between a respective one of said front bottom stringers and a respective one of said front top stringers, and each said back vertical post of said back section extends between a respective one of said back bottom stringers and a respective one of said back top stringers.

3. The apparatus of claim 1, wherein each of said first hydraulic cylinders has a first end secured to said one of said front top stringers, and each of said first hydraulic cylinders has a second end secured to said one of said back top stringers.

4. The apparatus of claim 1, wherein each of said second hydraulic cylinders are pivotally mounted to a respective front top stringers said front lateral tubular structures each further including a leg pivotally mounted to a respective front bottom stringer, each said leg being connected to a respective support foot.

* * * * *